(12) United States Patent
Satoh

(10) Patent No.: US 6,638,220 B2
(45) Date of Patent: Oct. 28, 2003

(54) ULTRASONIC IMAGING METHOD AND ULTRASONIC IMAGING APPARATUS

(75) Inventor: Tomoo Satoh, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/080,409

(22) Filed: Feb. 25, 2002

(65) Prior Publication Data

US 2002/0120194 A1 Aug. 29, 2002

(30) Foreign Application Priority Data

Feb. 26, 2001 (JP) .................................. 2001-049735

(51) Int. Cl.⁷ ............................................... A61B 8/00
(52) U.S. Cl. ..................... 600/437; 600/440; 600/443; 600/447
(58) Field of Search ................... 600/437–472

(56) References Cited

U.S. PATENT DOCUMENTS

| | | | |
|---|---|---|---|
| 4,463,763 A | * 8/1984 | Koyano et al. | 600/440 |
| 4,787,393 A | * 11/1988 | Fukukita et al. | 600/440 |
| 4,817,619 A | * 4/1989 | Sugiyama et al. | 600/455 |
| 4,873,985 A | * 10/1989 | Nakajima | 600/445 |
| 5,203,335 A | * 4/1993 | Noujaim et al. | 600/447 |
| 5,456,256 A | * 10/1995 | Schneider et al. | 600/445 |
| 5,608,849 A | * 3/1997 | King, Jr. | 345/419 |
| 5,873,830 A | * 2/1999 | Hossack et al. | 600/447 |
| 5,967,985 A | * 10/1999 | Hayakawa | 600/440 |
| 6,123,670 A | * 9/2000 | Mo | 600/447 |
| 6,261,232 B1 | * 7/2001 | Yokosawa et al. | 600/443 |
| 6,413,217 B1 | * 7/2002 | Mo | 600/440 |

OTHER PUBLICATIONS

T. Ohta. "Trend to Real–Time Three–Dimensional Echocardiography". Eizo Jyoho (M) vol. 32, No. 22, pp. 1248–1254, Nov., 2000.

\* cited by examiner

Primary Examiner—Marvin M. Lateef
Assistant Examiner—William C. Jung
(74) Attorney, Agent, or Firm—Sughrue Mion, PLLC (57) ABSTRACT

Since a number of ultrasonic beams which are transmitted within unit time is increased, an ultrasonic imaging method is capable of obtaining image information in a high frame rate or improving resolution of the image information. In an ultrasonic imaging method of transmitting an ultrasonic beam toward a measurement target located within an object, receiving an ultrasonic echo and processing detection signals to obtain image information, there are provided with the steps of: (a) executing a pre-imaging operation and setting a region with respect to the measurement target on the basis of an image obtained by the pre-imaging operation; and (b) transmitting an ultrasonic beam in such a manner that the region set in step (a) is scanned and receiving an ultrasonic echo so as to execute an ultrasonic imaging operation.

10 Claims, 9 Drawing Sheets

ULTRASONIC IMAGING METHOD AND ULTRASONIC IMAGING APPARATUS

BACKGROUND OF THE INVENTION

1. Field of the Invention

The present invention generally relates to an ultrasonic imaging method and an ultrasonic imaging apparatus to be used in diagnosing organs existing in a biological body, or in performing nondestructive tests. More specifically, the present invention is directed to such an ultrasonic imaging method and ultrasonic imaging apparatus capable of obtaining image information in high frame rates, and/or capable of improving resolution of obtained image information.

2. Description of a Related Art

Normally, in ultrasonic imaging apparatuses utilized as ultrasonic diagnostic apparatuses or industrial-purpose defect (flaw) detecting apparatuses, ultrasonic probes are employed each contains a plurality of ultrasonic transducers and has ultrasonic transmission/reception functions. In one typical ultrasonic imaging apparatus equipped with such an ultrasonic probe, image information related to an object to be inspected may be obtained in such a manner that this object to be inspected is ultrasonically scanned by using ultrasonic beams, while the ultrasonic beams are produced by synthesizing ultrasonic waves transmitted from the plurality of ultrasonic transducers. Then, the ultrasonic imaging apparatus may reproduce either two-dimensional regional images or three-dimensional regional images of the object to be inspected based upon the obtained image information. As one of scanning methods of scanning an object to be inspected by way of such ultrasonic beams, so-called "sector scanning operation" is carried out by which a two-dimensional fan-shaped region is ultrasonically scanned along angular directions.

Originally, this sector scanning method has been developed as a method of observing cardiac portions (hearts) of biological bodies (human bodies) from intercostal portions thereof. In such a sector scanning method, an object to be inspected is scanned in an equi-interval along angular directions one after another by employing ultrasonic beams which are transmitted from a transmission point into the object to be inspected along a depth direction. Furthermore, image information is sampled at a plurality of sampling points one after another. These sampling points are distributed in the equi-interval along the depth direction of the object to be inspected along the ultrasonic beams at the respective angles. As described above, while one ultrasonic beam is used to scan an object to be inspected, image information related to a plurality of sampling points located on this single ultrasonic beam is sampled at predetermined time intervals. Either a two-dimensional image or a three-dimensional image as to a cardiac portion (heart), which are obtained from the sampled image information, is called as an echocardiogram.

With respect to such sector scanning methods, two major scanning methods have been mainly known, namely a mechanical sector scanning method and an electronic sector scanning method.

According to the mechanical scanning method, a sector scanning operation is performed in such a manner that an ultrasonic probe is mechanically and pivotally moved by way of an oscillation motion, a swing motion, and the like.

According to the electronic scanning method, an ultrasonic probe constituted by arraying several tens of small-sized ultrasonic transducer elements is employed, and time differences are defined in timing for driving the respective ultrasonic transducer elements so that the ultrasonic transducer element group is equivalently driven in the swing motion.

On the other hand, currently, more correct and objective ultrasonic diagnostic methods are requested in medical fields. Under such circumstances, specific attentions are paid to imaging methods of real-time three-dimensional echocardiography capable of easily understanding three-dimensional structures of hearts. For example, please see Japanese publication entitled "TREND TO REAL-TIME THREE-DIMENSIONAL ECHOCARDIOGRAPHY" written by T. OHTA, EIZO JYOHO (M) Vol. 32, No. 22, pp. 1248–1254, published in November, 2000.

Conventionally, the below-mentioned imaging methods are known as the three-dimensional echocardiography imaging method:

(1) An imaging method in which a plurality of two-dimensional tomographic echocardiograms of an object to be inspected are stored by slowly moving an one-dimensional probe in a mechanical scanning manner by an operator, and then, these two-dimensional tomographic echocardiograms are displayed as a three-dimensional echocardiogram.

(2) An imaging method in which three-dimensional image information of an object to be inspected is obtained by performing an electronic scanning operation along one direction and also a mechanical scanning operation along another direction.

(3) An imaging method in which an object to be inspected is electronically scanned along two directions by employing a sparse two-dimensional ultrasonic sensor. This sparse two-dimensional ultrasonic sensor corresponds to such a sensor that some transducers are selectively used among transducers arrayed in a two-dimensional matrix form constituted by N columns×N rows.

However, the three-dimensional echocardiography imaging method (1) owns the following drawbacks. That is, the one-dimensional probe must be manipulated by skilled operators, and also, lengthy time is required to obtain the desirable image information. Also, according to the imaging method (2), the desirable image information can be obtained within shorter time than that in the first-mentioned imaging method (1). However, the frame rate (namely, total number of images displayed on display screen per unit time) is lower than, or equal to 20 frames per second, which can be hardly regarded as a high frame rate. Furthermore, according to the imaging method (3), the frame rate is lower than, or equal to 20 frames per second, which can also be hardly regarded as a high frame rate.

SUMMARY OF THE INVENTION

The present invention has been made to solve the above-described problems, and therefore, has an object to provide improved ultrasonic imaging method and apparatus capable of obtaining image information in a high frame rate or capable of increasing resolution by increasing a total number of ultrasonic beams which can be transmitted within unit time.

To solve the above-described problems, an ultrasonic imaging method according to one aspect of the present invention, of transmitting an ultrasonic beam toward a measurement target located within an object to be inspected, receiving an ultrasonic echo reflected from the measurement target and processing detection signals so as to obtain image information of the measurement target, comprises the steps of: (a) executing a pre-imaging operation and setting a region with respect to the measurement target on the basis of an image obtained by the pre-imaging operation; and (b) transmitting an ultrasonic beam in such a manner that the region set in step (a) is scanned and receiving an ultrasonic echo so as to execute an ultrasonic imaging operation.

Also, an ultrasonic imaging apparatus according to one aspect of the present invention, for transmitting an ultrasonic beam toward a measurement target located within an object to be inspected, receiving an ultrasonic echo reflected from the measurement target and processing detection signals so as to obtain image information of the measurement target, comprises: drive signal generating means for generating a plurality of drive signals; an ultrasonic probe for transmitting an ultrasonic beam in accordance with the drive signals generated by the drive signal generating means and receiving an ultrasonic echo which is produced by the transmitted ultrasonic beam to output a plurality of detection signals; signal processing means for obtaining image information of the measurement target on the basis of the plurality of detection signals output from the ultrasonic probe; measurement region setting means to be used for setting a region with respect to the measurement target; and control means for controlling both the drive signal generating means and the signal processing means to transmit the ultrasonic beam and receive the ultrasonic echo by using the ultrasonic probe in such a manner that the region set by the measurement region setting means is scanned.

In accordance with the ultrasonic imaging method and apparatus of the present invention, since the measuring time is shortened and a number of times of transmission/reception operations of the ultrasonic beam per unit time is increased, the imaging operation can be carried out with maintaining high frame rates or high resolution.

BRIEF DESCRIPTION OF THE DRAWINGS

A more better understanding of the present invention may be made by reading a detailed description in conjunction with the accompanying drawings, in which.

DESCRIPTION OF THE PREFERRED EMBODIMENTS

Referring now to drawings, various preferred embodiments of the present invention will be described in detail. It should be understood that the same reference numerals will be employed as those for indicating the same, or similar structural elements, and therefore, descriptions thereof are omitted.

Figure 1:
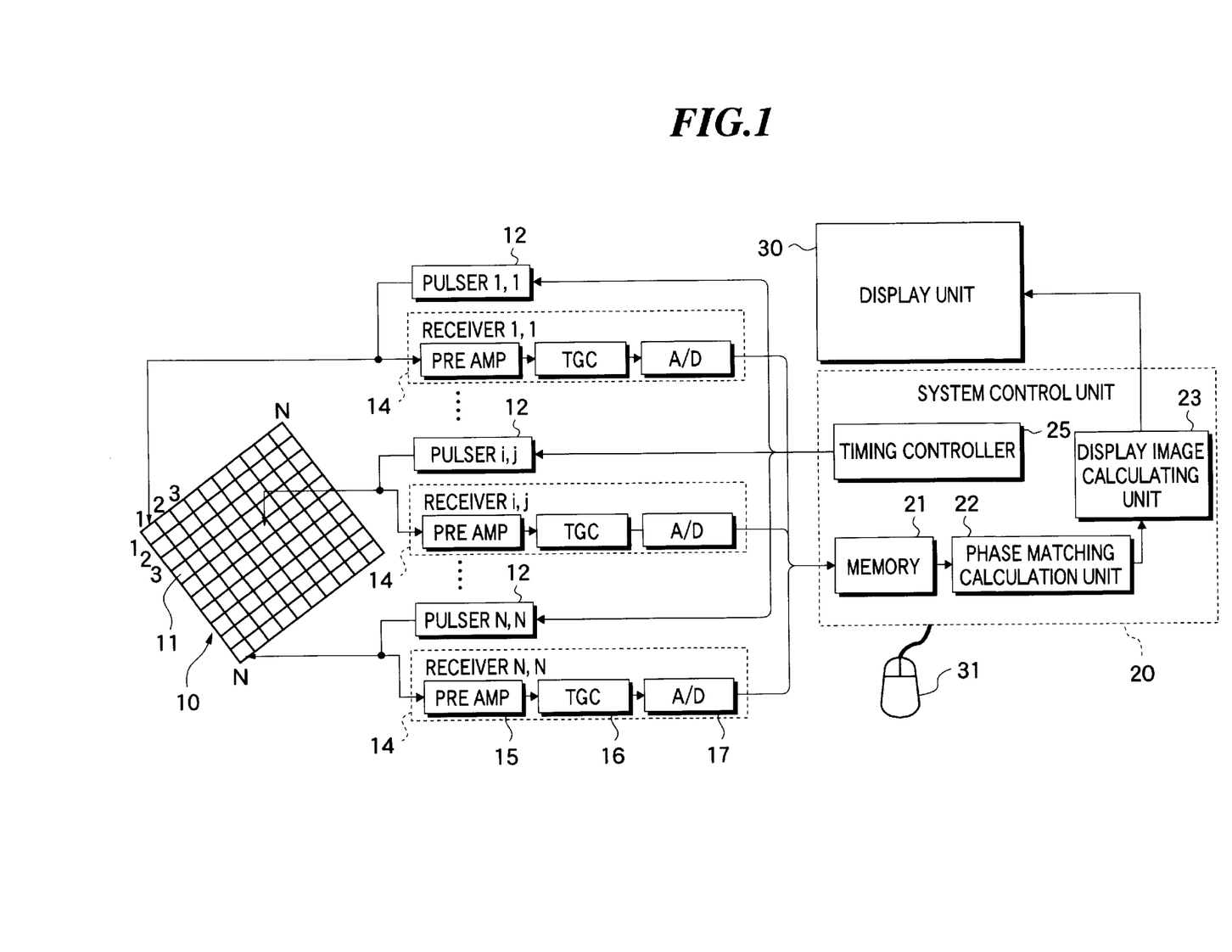
FIG. 1 is a schematic block diagram for indicating a major arrangement of an ultrasonic imaging apparatus according to one embodiment of the present invention.

FIG. 1 is a schematic block diagram for indicating a major arrangement of an ultrasonic imaging apparatus according to one embodiment of the present invention. This ultrasonic imaging apparatus may be employed as, for example, an ultrasonic diagnostic apparatus to be used for diagnosing a biological body (human body) or a defect (flaw) detecting apparatus to be used in an industrial field.

As indicated in FIG. 1, this ultrasonic imaging apparatus is equipped with an ultrasonic probe 10, which is used by abutting against an object to be inspected. The ultrasonic probe 10 is constructed in such a manner that a plurality ($N \times N = N^2$ pieces) of ultrasonic transducers 11 having transmission/reception functions of ultrasonic waves (ultrasonic pulses) are arrayed in a two-dimensional matrix shape constructed of N columns×N rows. As to the ultrasonic transducer 11, for example, piezoelectric elements are employed which involves one of piezoelectric ceramics typically known as PZT (Pb(lead) zirconate titanate) and a polymer piezoelectric element typically known as PVDF (polyvinyl difluoride). Alternatively, instead of employing such an ultrasonic transducer having the transmission/reception function of the ultrasonic pulses in the ultrasonic probe 10, a piezoelectric element as an ultrasonic wave transmitting element may be combined with an ultrasonic transducer of an optical converting type as an ultrasonic wave receiving element. As to the optical converting type ultrasonic transducer, either Fabry-Perot resonators (abbreviated as "FPR") or fiber Bragg gratings may be employed which are formed on the respective tip portions of very fine optical fibers.

$N^2$ sets of pulsers 12 and $N^2$ sets of receivers 14 are connected to $N^2$ pieces of ultrasonic transducers 11, respectively.

Each of the pulsers 12 is energized in response to an output signal of a timing controller 25 built in a system control unit 20 (will be explained later), and thus, outputs a drive signal to the corresponding (relevant) ultrasonic transducer 11. The respective ultrasonic transducers 11 transmit ultrasonic pulses to the object to be inspected in response to the drive signals output from the relevant pulsers 12, and then, receive ultrasonic echoes to output detection signals. These ultrasonic echoes are produced by that these transmitted ultrasonic pulses are reflected from interiors of this object to be inspected. As such a pulser, a high-speed pulser which can output a drive signal in a high repetition cycle may be preferably employed.

Each receiver 14 is provided with a preamplifier 15, a TGC (time gain compensation) amplifier 16, and an A/D converter 17. A detection signal output from each of the ultrasonic transducers 11 is analog-processed by the preamplifier 15 and the TGC amplifier 16, which are contained in the corresponding receiver 14. The levels of these detection signals are matched to input level of the A/D converter 17 owing to this analog process operation. The analog detection signal output from the TGC amplifier 16 is converted into a digital detection signal by the A/D converter 17.

The respective pulsers 12 and receivers 14 are connected to the system control unit 20 for controlling the entire system of the ultrasonic imaging apparatus. As previously explained, the respective pulsers 12 are connected to a timing controller 25 built in the system control unit 20. The timing controller 25 outputs signals used to energize the respective pulsers 12. This timing controller 25 can control generation timing of drive signals which are output from a plurality of pulsers 12 in order to transmit ultrasonic beams toward a plurality of directions.

The respective receivers 14 are connected to a memory 21 which is connected to a phase matching calculation unit 22 in the system control unit 20.

The phase matching calculation unit 22 contains $N^2$ pieces of calculation lines which correspond to the above-described $N^2$ pieces of ultrasonic transducers 11. Each of the calculation lines contained in the phase matching calculation unit 22 may be constituted by a shift register delay line, a digital fine delay device or a CPU (central processing unit) and a software program, or it may be constituted by combining some of them. The detection data output from the respective A/D converters 17 of the plural receivers 14 are once stored in the memory 21, and thereafter, these detection data are entered into a plurality of calculation lines of the phase matching calculation unit 22. The phase matching calculation unit 22 performs a phase matching operation in such a manner that predetermined delay amounts are applied to the detection data which are entered into the respective calculation lines, and furthermore, these detection data are digitally added to each other. Since such a phase matching calculation unit 22 is employed, reception focusing operations can be simultaneously accomplished with respect to the plural directions towards the object to be inspected. The resultant data in which phases are matched with each other by the phase matching calculation unit 22 are output to a display image calculating unit 23.

The display image calculating unit 23 executes the below-mentioned processing operations with respect to the detection data entered from the phase matching calculation unit 22. That is, a waveform of the detection data is detected, the detected waveform is converted into image data, a predetermined image processing operation is executed upon the image data, and furthermore, the scanning format is converted. As a result, the image data of the ultrasonic-beam data space is converted into image data of a physical space. Further, the display image calculating unit 23 performs such a calculation that voxel data which is data as to a certain volume is produced on the basis of a plurality of tomographic image data so as to display a three-dimensional image.

A display unit 30 is connected to the display image calculating unit 23. The display unit 30 executes D/A conversion to convert the image data, in which scanning format has been converted in the above-described image calculating unit 23, into an analog image signal, and then, displays thereon a three-dimensional ultrasonic image of the object to be inspected.

The system control unit 20 includes a measuring region setting device 31. This measuring region setting device 31 corresponds to an instrument for marking such a region as an existing range of a measurement target, on a display screen of the display unit 30. As this measuring region setting device 31, for example, a pointing device such as a mouse and a light pen may be employed.

Figure 2:
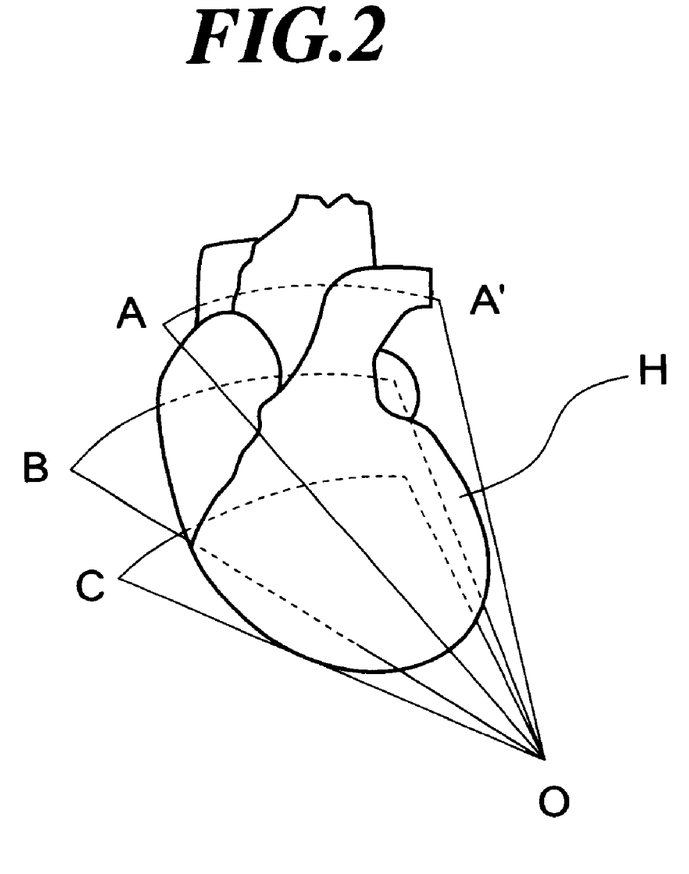
FIG. 2 is a diagram for schematically representing a heart "H" which is imaged by way of a three-dimensional ultrasonic imaging method from an apex portion of the heart.
Figure 3A:
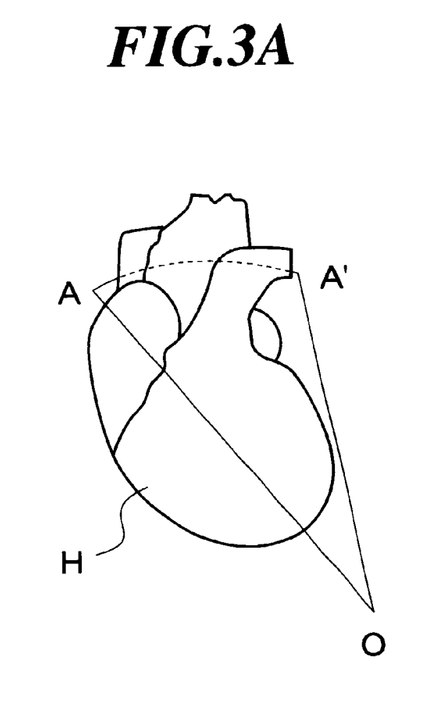
FIG. 3A is a diagram for showing a position of a tomographic plane OAA' of the heart "H" indicated in FIG. 2.
Figure 3B:
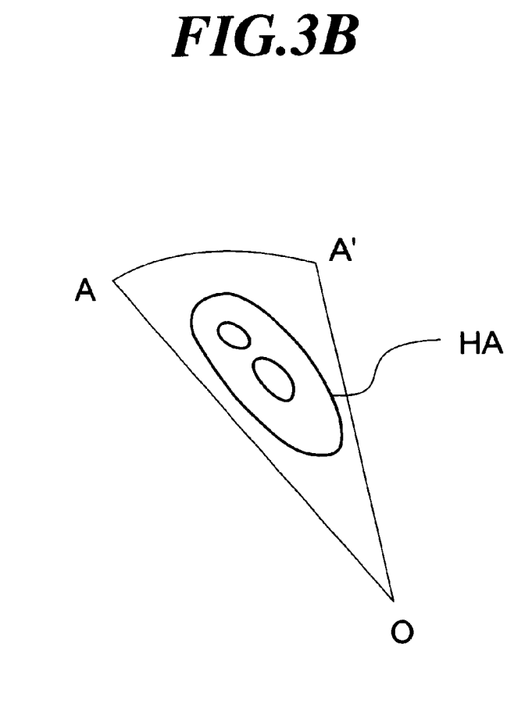
FIG. 3B is a diagram for representing the tomographic plane OAA'.
Figure 4A:
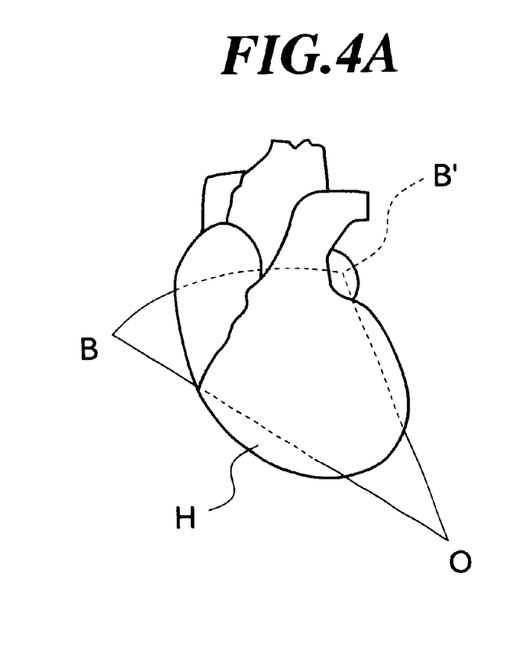
FIG. 4A is a diagram for showing a position of a tomographic plane OBB' of the heart "H" indicated in FIG. 2.
Figure 4B:
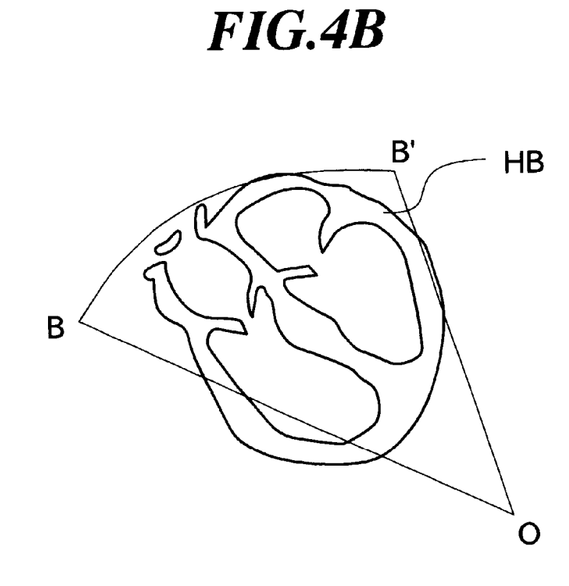
FIG. 4B is a diagram for representing the tomographic plane OBB'.
Figure 5A:
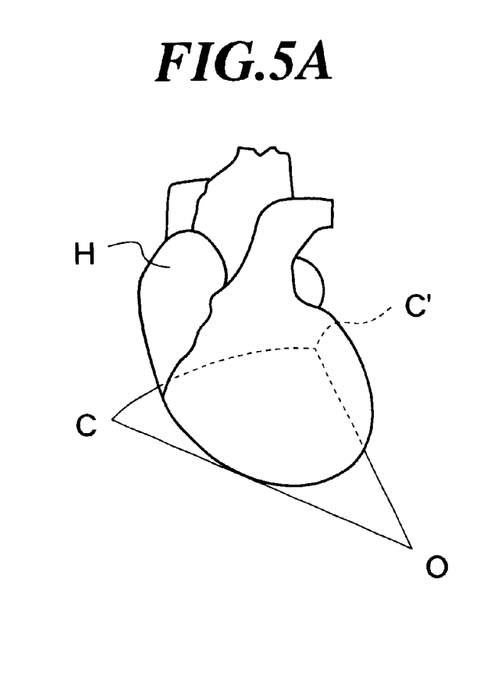
FIG. 5A is a diagram for showing a position of a tomographic plane OCC' of the heart "H" indicated in FIG. 2.
Figure 5B:
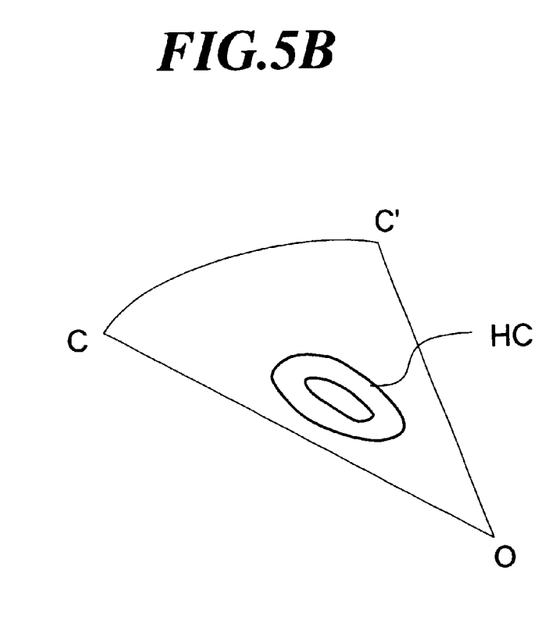
FIG. 5B is a diagram for representing the tomographic plane OCC'.

Next, an ultrasonic imaging method according to a first embodiment of the present invention will now be described with reference to FIGS. 1 to 7B. In this first embodiment, as illustratively shown in FIG. 2, a description is made of such a case where a heart within a biological body (human body) is ultrasonically imaged is exemplified. FIG. 2 schematically shows a heart "H" as viewed from an apex portion "O" of the heart "H". Also, FIG. 3A illustratively shows one tomographic image OAA' of the heart "H", and FIG. 3B illustratively shows the tomographic image OAA' which includes a tomographic image HA of the heart "H". Similarly, FIG. 4A illustratively shows one tomographic image OBB' of the heart "H", and FIG. 4B illustratively shows the tomographic image OBB' which includes a tomographic image HB of the heart "H". Furthermore, FIG. 5A illustratively shows one tomographic image OCC' of the heart "H", and FIG. 5B illustratively shows the tomographic image OCC' which includes a tomographic image HC of the heart "H".

In the ultrasonic imaging method of this first embodiment, a pre-imaging operation is firstly carried out before a main ultrasonic imaging operation is commenced. In other words, while a slow frame rate is employed, ultrasonic images are previously obtained up to a visible depth in the vicinity of the heart "H". The ultrasonic images obtained by the pre-imaging operations are displayed on the display unit 30. That is to say, the tomographic plane OAA' as shown in FIG. 3B, the tomographic plane OBB' as shown in FIG. 4B, or the tomographic plane OCC' as shown in FIG. 5B is displayed on the display screen of the display unit 30.

Next, an operator of the ultrasonic imaging apparatus marks an existing range of a tomographic image HA, a tomographic image HB, or a tomographic image HC on the image displayed on the display unit 30 by employing the measuring region setting device 31.

Subsequently, the main ultrasonic imaging operation is carried out. That is, a tomographic image of the heart "H", which has been marked by manipulating the measuring region setting device 31 in the pre-imaging operation, is ultrasonically imaged. A sector scanning process executed in this first embodiment will now be described in comparison with the conventional sector scanning process in the case where an image of, for example, the tomographic plane OBB' as shown in FIG. 4B is obtained by sector-scanning.

Figure 6A:
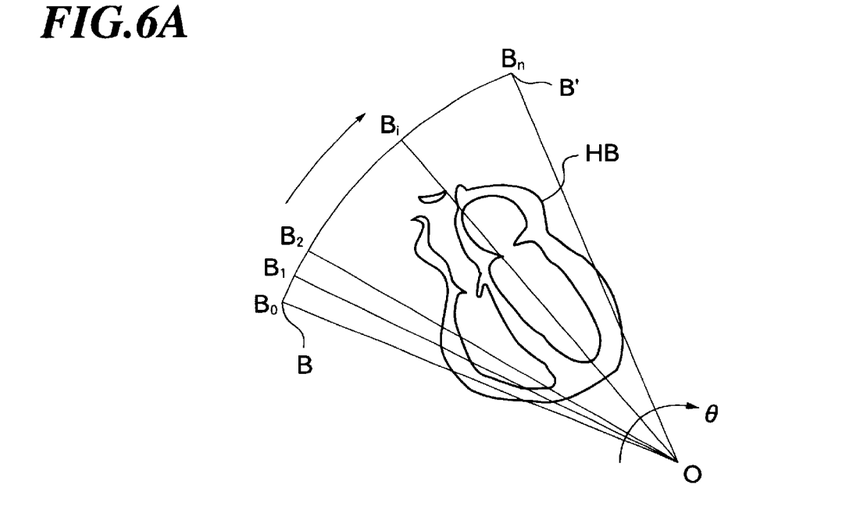
FIGS. 6A and 6B are explanatory diagrams for explaining the conventional ultrasonic scanning method in comparison with an ultrasonic scanning method of the present invention.
Figure 6B:
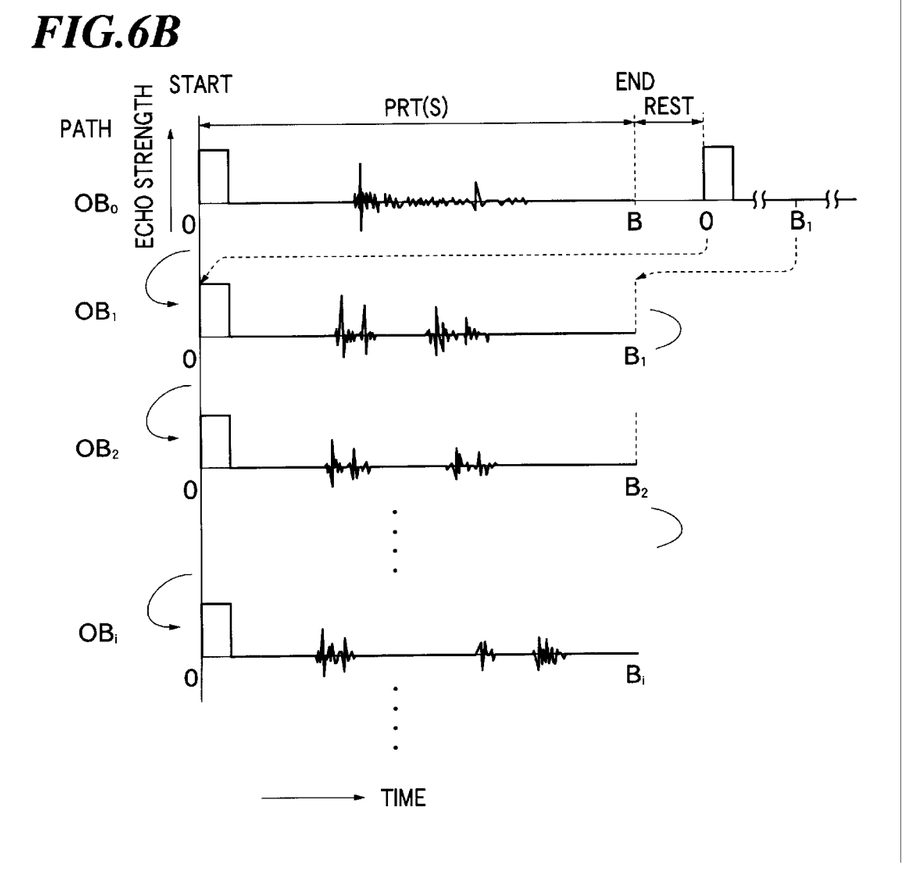
Figure 7A:
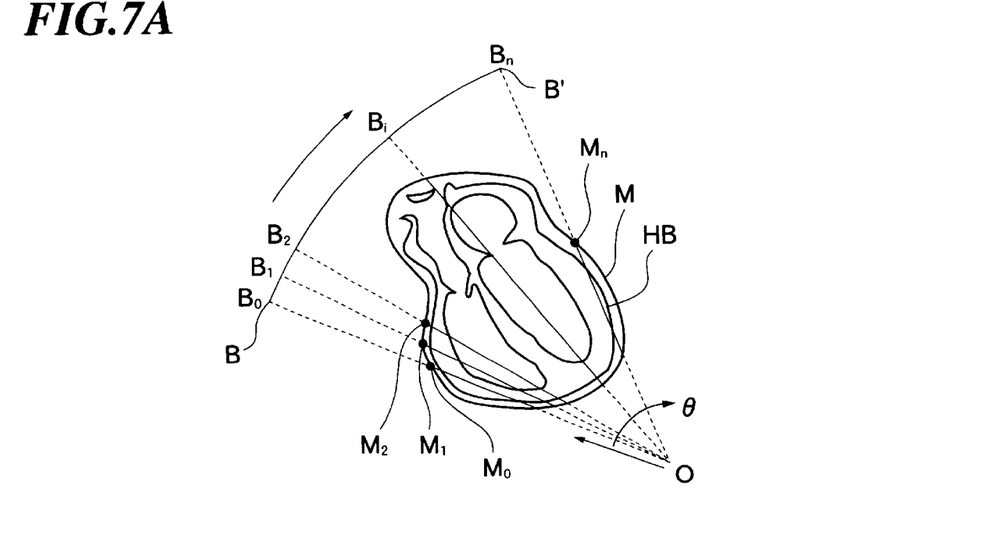
FIGS. 7A and 7B are explanatory diagrams for explaining an ultrasonic imaging method according to a first embodiment of the present invention.
Figure 7B:
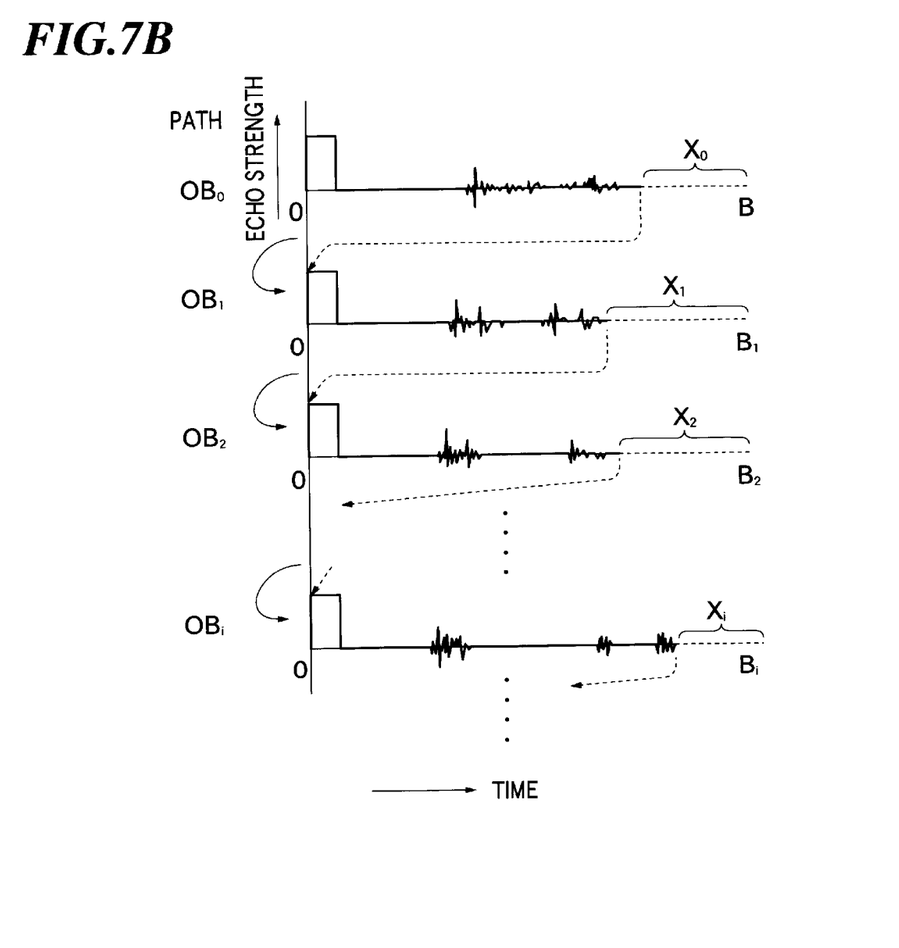

FIGS. 6A and 6B are explanatory diagrams for explaining the conventional ultrasonic scanning process. FIG. 6A illustratively shows both the tomographic plane OBB' which contains the tomographic image HB of the heart "H" as shown in FIG. 4B, and a locus (trail) of ultrasonic beams which scan over this tomographic plane OBB'. Also, FIG. 6B is a time chart for describing an ultrasonic scanning process which is executed so as to obtain such a sector image as shown in FIG. 6A. On the other hand, FIGS. 7A and 7B are explanatory diagrams for explaining the ultrasonic scanning process according to this embodiment. FIG. 7A illustratively shows both the tomographic plane OBB' which contains the tomographic image HB of the heart "H" as shown in FIG. 4B, and a locus (trail) of ultrasonic beams which scan over this tomographic plane OBB'. In this case, symbols $M_0$, $M_1$, - - -, $M_n$ represent an existing range "M" of the tomographic image RB which is marked after a pre-imaging operation has been carried out. Also, FIG. 7B is a time chart for describing an ultrasonic scanning process which is executed so as to obtain such a sector image as shown in FIG. 7A. In FIGS. 6B and 7B, an ordinate indicates echo strength, and an abscissa shows time.

As shown in FIG. 6A or 7A, in the case where the fan-shaped two-dimensional region OBB' is scanned by the ultrasonic beam, the ultrasonic beam is firstly transmitted from an apex portion "O" of the heart "H" toward a point $B_0$, and then, points $B_1$, $B_2$, - - - , $B_n$ are scanned one after another. This fan-shaped two-dimensional region OBB' is defined by such a fan-shaped region between an ultrasonic beam $OB_0$ and another ultrasonic beam $OB_n$. Paths $OB_0$, $OB_1$, - - - , $OB_n$ of the respective ultrasonic beams which are extended from the apex portion "O" to the depth directions respectively may be realized by synthesizing the ultrasonic pulses, which are transmitted from a plurality of ultrasonic transducers 11, to each other.

As shown in FIG. 6A, in the conventional scanning process, after the transmission/reception operation of the ultrasonic pulse/echo along the first path $OB_0$ is completed and predetermined rest time has passed, the transmission/reception operation of the ultrasonic pulse/echo along the next path $OB_1$ is commenced. The measurement time of the ultrasonic beam for each path of the ultrasonic beam corresponds to a time duration between a time point when the ultrasonic pulse is transmitted and a time point when the echo of the ultrasonic pulse reflected at the maximum depth point within the object to be inspected and returned from this maximum depth is received. This measurement time is indicated by repetition time PRT(S) in FIG. 6B. Such a scanning process is repeatedly carried out in an equi-interval along a direction of an angle "θ" with respect to the fan-shaped two-dimensional region OBB'. Since the transmission/reception operation of the ultrasonic pulse/echo is carried out along all of the paths $OB_0$, $OB_1$, - - - , $OB_n$ of the ultrasonic beams, image information of the entire tomographic plane may be obtained. As a result, measurement time Tm which is required to form one sheet of a sector image is given as follows:

$Tm=(T1+T2+Tr)\times Np$

T1: time duration between a time point when the ultrasonic pulse is transmitted and a time point when the ultrasonic pulse reaches maximum depth T2: time duration between a time point when the ultrasonic pulse is reflected at the maximum depth and a time point when the echo is received Tr: rest time Np: total path number of transmitted ultrasonic beams On the other hand, in the scanning process according to this first embodiment, the existing range "M" of the heart "H" is previously marked by performing the pre-imaging operation. Since the display unit 30 monitors this marking operation, the display unit 30 converts a length of each of the ultrasonic beams displayed on the display screen into arrival time of the ultrasonic pulse.

In the scanning process of this first embodiment, an ultrasonic pulse is transmitted from the apex portion "O" of the heart "H" along the path $OB_0$. This ultrasonic pulse passes through the tomographic image HB of the heart "H" located within the existing range "M" and then is reached to a maximum depth within a biological body. However, echoes which are reflected from the points farther than the maximum depth of the tomographic image HB of the heart "H" are essentially unnecessary echoes. Therefore, as shown in FIG. 7A, when the ultrasonic pulse is transmitted from the apex portion "O" along the first path $OB_0$, such echoes which have been produced up to the maximum depth of the existing range "M" on the path $OB_0$ are received among all of echoes produced from this ultrasonic pulse. At a time point when the echo produced at the maximum depth $M_0$ of the existing range "M" is received, a transmission of an ultrasonic pulse is commenced along the subsequent path $OB_1$. In other words, a reception of echoes which are produced at the points farther than this maximum depth $M_0$ is skipped. As a result, as shown in FIG. 7B, with respect to the first path $OB_0$, such a scanning time $X_0$ may be shortened which corresponds to a distance between the maximum depth $M_0$ of the existing range "M" and the maximum depth "$B_0$" within the biological body.

Similar to the case of the first path $OB_0$, as to the next path $OB_1$, such echoes which have been produced up to a maximum depth $M_1$ of the existing range M on the path $OB_1$ are received, whereas a reception of echoes produced at the points farther than this maximum depth $M_1$ is skipped. Then, at a time instant when such an echo produced at the maximum depth $M_1$ of the existing range "M" is received, a transmission of an ultrasonic pulse along the next path $OB_2$ (third path) is commenced. As previously explained, while the receptions of such echoes are skipped which are produced at the points farther than the maximum depths $M_0$, $M_1$, $M_2$, - - - , $M_n$ of the existing range "M" of the tomographic image HB, the paths $OB_0$, $OB_1$, $OB_2$, - - - , $OB_n$ are scanned in an equi-distance in a plurality of directions one after another along an angle "θ" with respect to the fan-shaped two-dimensional region OBB' shown in FIG. 7A. As a consequence, as shown in FIG. 7B, since the scanning time $X_0$, $X_1$, $X_2$, - - - , $X_n$ can be shortened in the respective scanning processes, the scanning time as to the entire region of the fan-shape two-dimensional region OBB' can be largely shortened, as compared with the scanning time in the conventional scanning process as shown in FIG. 6.

Although most of the reflected echoes are produced from the plural locations of the measurement target (namely, heart "H"), only the detection signals corresponding to the focal region may be emphasized in such a manner that the phase matching calculation unit 22 applies both proper weights and proper time differences to the respective detection signals, and thereafter, adds these processed detection signals to each other.

An ultrasonic imaging method according to a second embodiment of the present invention will now be described.

Figure 8A:
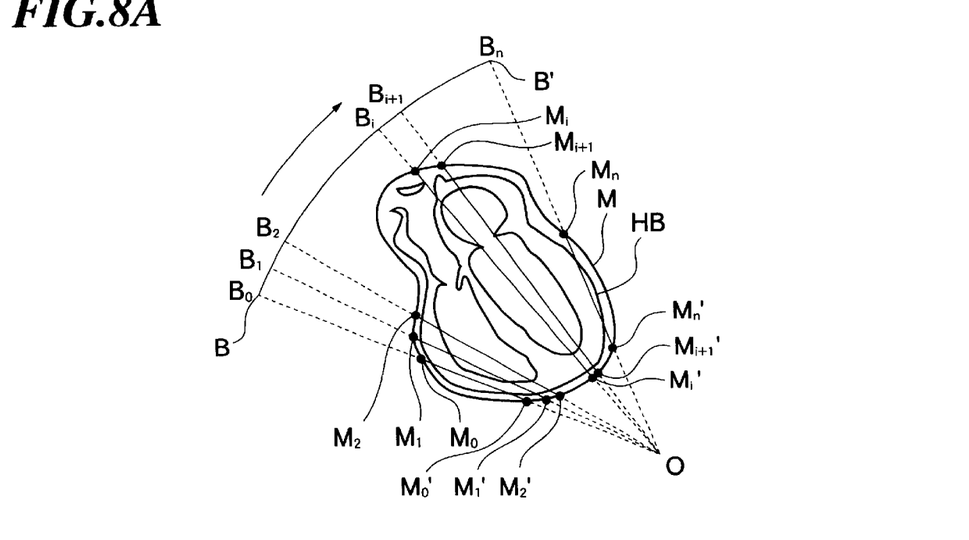
FIGS. 8A to 8C are explanatory diagrams for explaining an ultrasonic imaging method according to a second embodiment of the present invention.
Figure 8B:
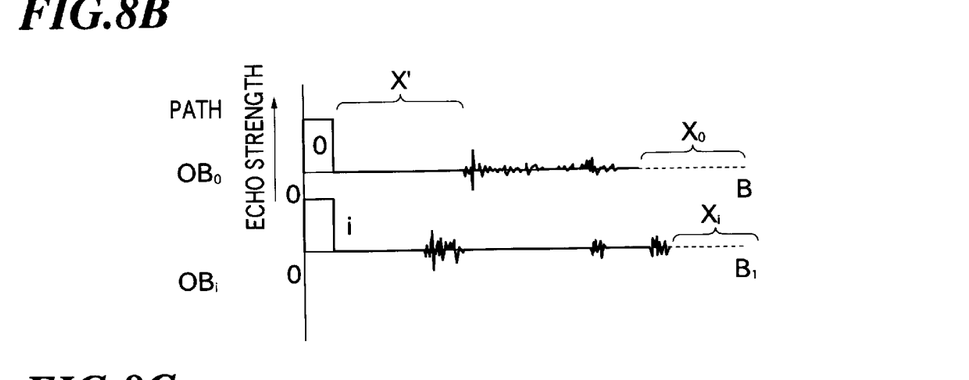
Figure 8C:
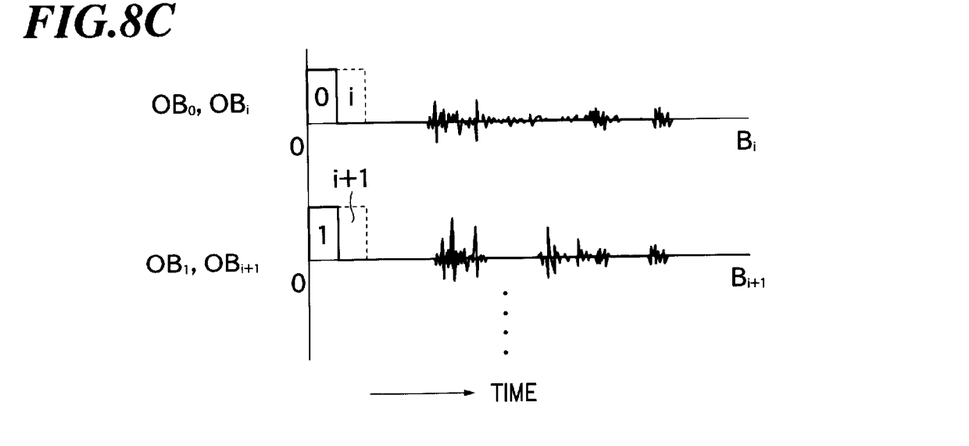

FIG. 8A illustratively shows both the tomographic plane OBB' which contains the tomographic image HB of the heart "H" as shown in FIG. 4B, and also shows a locus of an ultrasonic beam which scans over this tomographic plane OBB'. FIG. 8B shows a time chart of an ultrasonic scanning process which is performed in order to obtain a sector image as shown in FIG. 8A. FIG. 8C is a time chart showing reception waveforms of reflected echoes.

In this second embodiment, similar to the above-explained first embodiment, a pre-imaging operation is carried out, and a peripheral portion of the tomographic image HB of the heart "H" is marked so as to set the existing range "M".

Next, a main ultrasonic imaging operation is carried out. As sown in FIG. 8B, both an ultrasonic pulse along one path $OB_0$ from an apex portion "O" of the heart "H", and also an ultrasonic pulse along another path $OB_i$ are transmitted in a continuous mode. Alternatively, although both the ultrasonic pulses are not continuously transmitted, the below-mentioned ultrasonic pulse transmission timing manner may be employed. That is, the ultrasonic beam along the path $OB_0$ is reflected at a minimum depth $M_0'$ of the existing range "M" appeared on this path $OB_0$ and before the reflected ultrasonic pulse (echo) is reached to the ultrasonic probe, another ultrasonic beam along another path $OB_i$ is transmitted. As explained above, since the ultrasonic pulses are transmitted in such a manner that these ultrasonic beams along the two paths scan over the existing range "M" during the substantially same time duration, a time period required for scanning the tomographic plane OBB' can be reduced to approximately ½.

Echoes produced in both the path $OB_0$ and the path $OB_i$ are superposed on each other and then received by the ultrasonic imaging apparatus as shown in FIG. 8C. These ultrasonic echoes may be separated from each other by a calculation process operation executed in the phase matching calculation unit 22.

In this ultrasonic imaging apparatus, such echoes produced up to a maximum depth $M_0$ or $M_i$ of the existing range "M" are received among echoes produced along the path $OB_0$ or $OB_i$. In other words, receptions of echoes which are produced at the points farther than the maximum depth $M_0$ or $M_i$ are skipped, and then, ultrasonic pulses are transmitted along a next path or next paths (for example, combination of path $OB_1$ and path $OB_{i+1}$). As explained above, since the receptions of echoes produced at the points farther than the maximum depth $M_0$ or $M_i$ of the existing range "M" are skipped, scanning time $X_0$ or $X_i$ for the points farther than the maximum depth $M_0$ or $M_i$ can be shortened.

Similarly, both an ultrasonic pulse along one path $OB_1$ and another ultrasonic pulse along another path $OB_{i+1}$ are transmitted in a continuous mode. In this ultrasonic imaging apparatus, echoes produced up to a maximum depth $M_1$ or $M_{i+1}$ of the existing range "M" are received among echoes produced along the path $OB_1$ or $OB_{i+1}$. Thus, receptions of such echoes which are produced at the points farther than these maximum depths are skipped.

As explained above, the ultrasonic scanning operation by combining the two ultrasonic beams with each other is repeatedly carried out in an equi-interval along a direction of an angle "θ" with respect to the fan-shaped two-dimensional region OBB' as shown in FIG. 8A.

According to this second embodiment, the scanning time for the points located farther than the maximum depths of the existing range "M" can be shortened. Furthermore, the ultrasonic beams along the two paths scan over the object to be inspected during the substantially same time duration. As a result, the overall scanning time can be improved, and therefore, the frame rate can be heightened. On the other hand, in the case where the frame rate is made constant, images having high resolution can be obtained.

When selecting a plurality of paths along which the object to be inspected is scanned during the substantially same time duration, it is preferable to select a plurality of paths, for instance, the path $OB_0$ and the path $OB_i$, which are spatially separated from each other. In this case, the echoes reflected from the respective directions may be easily separated from each other by performing the reception focusing operation. At this time, a plurality of paths contained in one tomographic plane may be selected. Alternatively, a plurality of paths which are contained in different tomographic planes may be selected. For example, both a path contained in the tomographic plane OAA' as shown in FIG. 3B and another path contained in the tomographic plane OBB' as shown in FIG. 4B may be alternatively selected.

Figure 9:
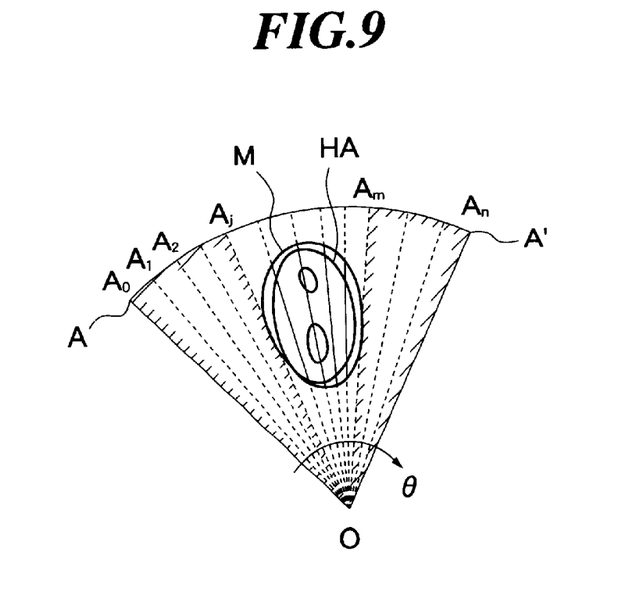
FIG. 9 is an explanatory diagram for explaining an ultrasonic imaging method according to a third embodiment of the present invention.

Referring now to FIG. 9, an ultrasonic imaging method according to a third embodiment of the present invention will be described. FIG. 9 illustratively shows both the tomographic plane OAA' which contains the tomographic image HA of the heart H indicated in FIG. 3B, and a locus of an ultrasonic beam which scans over this tomographic plane OAA'.

In this third embodiment, similar to the above-explained first embodiment, a pre-imaging operation is carried out, and a peripheral portion of the tomographic image HA of the heart "H" is marked so as to set the existing range "M". Then, while an attention is paid to this existing range "M", a scanning operation of such a region other than the existing range "M" is skipped as to a scanning direction "θ".

As shown in FIG. 9, in the two-dimensional region OAA', the existing range "M" is located between a path $OA_j$ and a path $OA_m$. As a result, both a range defined by a path $OA_0$ to the path $OA_j$ and also another range defined by a path $OA_m$ to a path $OA_n$, which are located in both sides of the existing range "M", are skipped along the angle direction "θ". In this case, a scanning operation similar to that of either the first embodiment or the second embodiment is carried out within such a range defined by the path $OA_j$ to the path $OA_m$ which passes through the existing range "M".

In accordance with this third embodiment, since the ultrasonic pulse scanning operation is carried out while skipping such an unnecessary range along the angle direction "θ" in addition to the unnecessary range along the depth direction, the overall scanning time can be furthermore shortened.

Figure 10:
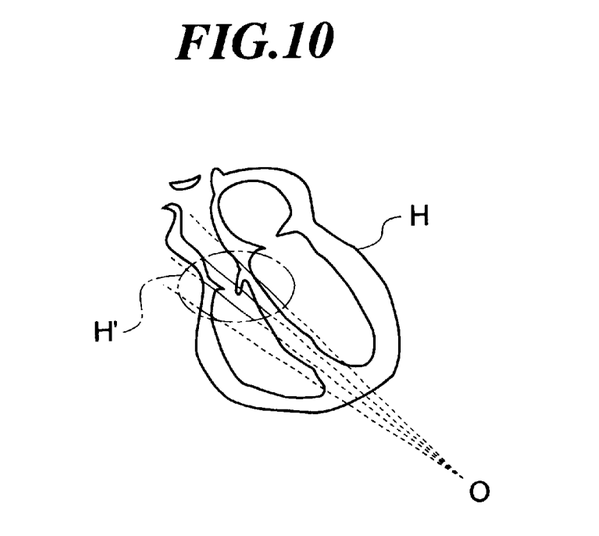
FIG. 10 is an explanatory diagram for explaining an ultrasonic imaging method according to a fourth embodiment of the present invention.

Next, an ultrasonic imaging method according to a fourth embodiment of the present invention will now be explained with reference to FIG. 10. FIG. 10 schematically shows a heart to explain the ultrasonic imaging method of this fourth embodiment.

In this fourth embodiment, in the case where only a partial region within an object to be inspected is of interest such as a valve portion "H'" of a heat "H" as shown in FIG. 10, only this region is limitedly scanned by using ultrasonic pulses.

Similar to the first embodiment, a pre-imaging operation is firstly carried out, and an area in the vicinity of the valve portion "H'" of the heat "H" is marked by using the measuring region setting device 31. When a major imaging operation is carried out, only such an area in the vicinity of the valve portion "H'", which is marked, is scanned by using ultrasonic beams by combining the scanning methods of the ultrasonic beam according to the first to third embodiments with each others.

In accordance with this fourth embodiment, since the ultrasonic beam is scanned only to the small region and the unnecessary range is skipped, the ultrasonic imaging operation can be carried out in the high efficiency.

As previously described in detail, according to the present invention, the measuring time required in the scanning operation of the ultrasonic beam executed one time can be shortened. Also, the scanning operations of the ultrasonic beams can be carried out along the plural directions at the same time. Therefore, a total number of ultrasonic beams which are transmitted per unit time can be increased. As a result, the ultrasonic imaging apparatus according to the present invention can obtain image information in the high frame rates, or can improve the resolution of the obtained image information.

What is claimed is:

1. An ultrasonic imaging method of transmitting an ultrasonic beam toward a region of interest located within an object to be inspected, receiving an ultrasonic echo reflected from said region of interest and processing detection signals so as to obtain image information of said region of interest, said method comprising the steps of:

(a) executing a pre-imaging operation to obtain, if any, a minimum depth point and a maximum depth point of said region of interest for each ultrasonic beam;

(b) setting a sub-region to be imaged on the basis of the minimum depth point and the maximum depth point of said region of interest obtained at step (a); and (c) transmitting an ultrasonic beam in such a manner that the sub-region set at step (b) is scanned so as to execute an ultrasonic imaging operation for said sub-region and to preclude an ultrasonic imaging operation for an outside of said sub-region.

2. An ultrasonic imaging method according to claim 1, wherein:

step (b) includes setting a sub-region which corresponds to an existing range of said region of interest.

3. An ultrasonic imaging method according to claim 1, wherein:

step (b) includes setting a sub-region which is limited to a portion of said region of interest.

4. An ultrasonic imaging method of transmitting an ultrasonic beam toward a region of interest located within an object to be inspected, receiving an ultrasonic echo reflected from said region of interest and processing detection signals so as to obtain image information of said region of interest, said method comprising the steps of:

(a) executing a pre-imaging operation to obtain, if any, a minimum depth point and a maximum depth point of said region of interest for each ultrasonic beam;

(b) setting a sub-region to be imaged on the basis of the minimum depth point and the maximum depth point of said region of interest obtained at step (a); and (c) transmitting an ultrasonic beam in such a manner that the sub-region set at step (b) is scanned and receiving an ultrasonic echo so as to execute an ultrasonic imaging operation, wherein:

step (c) includes receiving an ultrasonic echo which is produced at a maximum depth point within the sub-region set in step (b) in one direction, and thereafter starting to transmit an ultrasonic beam toward another different direction.

5. An ultrasonic imaging method according to claim 1, wherein:

step (c) includes transmitting one ultrasonic beam along one direction and transmitting another ultrasonic beam along another direction before the one ultrasonic beam reaches a minimum depth point within the sub-region set at step (b) and receiving ultrasonic echoes reflected from the one and another directions and separating detection signals from each other.

6. An ultrasonic imaging method of transmitting an ultrasonic beam toward a region of interest located within an object to be inspected, receiving an ultrasonic echo reflected from said region of interest and processing detection signals so as to obtain image information of said region of interest, said method comprising the steps of:

(a) executing a pre-imaging operation to obtain, if any, a minimum depth point and a maximum depth point of said region of interest for each ultrasonic beam;

(b) setting a sub-region to be imaged on the basis of the minimum depth point and the maximum depth point of said region of interest obtained at step (a); and (c) transmitting an ultrasonic beam in such a manner that the sub-region set at step (b) is scanned so as to execute an ultrasonic imaging operation, wherein:

step (c) includes transmitting one ultrasonic beam along one direction and transmitting another ultrasonic beam along another direction before the one ultrasonic beam reaches a minimum depth point within the sub-region set at step (b) and receiving ultrasonic echoes reflected from the one and another directions and separating detection signals from each other.

7. An ultrasonic imaging apparatus for transmitting an ultrasonic beam toward a region of interest located within an object to be inspected, receiving an ultrasonic echo reflected from said region of interest and processing detection signals so as to obtain image information of said region of interest, said apparatus comprising:

drive signal generating means for generating a plurality of drive signals;

an ultrasonic probe for transmitting an ultrasonic beam in accordance with the drive signals generated by said drive signal generating means and receiving an ultrasonic echo which is produced by the transmitted ultrasonic beam to output a plurality of detection signals;

signal processing means for obtaining image information of said region of interest on the basis of the plurality of detection signals output from said ultrasonic probe;

imaging sub-region setting means to be used for setting a sub-region to be imaged on the basis of at least one minimum depth point and at least one maximum depth point of said region of interest obtained by a pre-imaging operation; and control means for controlling both said drive signal generating means and said signal processing means to transmit the ultrasonic beam and receive the ultrasonic echo by using said ultrasonic probe in such a manner that the sub-region set by said imaging sub-region setting means is scanned so as to execute an ultrasonic imaging operation for said sub-region and to preclude an ultrasonic imaging operation for an outside of said sub-region.

8. An ultrasonic imaging apparatus for transmitting an ultrasonic beam toward a region of interest located within an object to be inspected, receiving an ultrasonic echo reflected from said region of interest and processing detection signals so as to obtain image information of said region of interest, said apparatus comprising:

drive signal generating means for generating a plurality of drive signals;

an ultrasonic probe for transmitting an ultrasonic beam in accordance with the drive signals generated by said drive signal generating means and receiving an ultrasonic echo which is produced by the transmitted ultrasonic beam to output a plurality of detection signals;

signal processing means for obtaining image information of said region of interest on the basis of the plurality of detection signals output from said ultrasonic probe;

imaging sub-region setting means to be used for setting a sub-region to be imaged on the basis of at least one minimum depth point and at least one maximum depth point of said region of interest obtained by a pre-imaging operation; and control means for controlling both said drive signal generating means and said signal processing means to transmit the ultrasonic beam and receive the ultrasonic echo by using said ultrasonic probe in such a manner that the sub-region set by said imaging sub-region setting means is scanned, wherein:

said control means controls said signal processing means in such a manner that an ultrasonic echo which is produced at a maximum depth point within the sub-region set by said imaging sub-region setting means in one direction is received, and thereafter controls said drive signal generating means to start to transmit an ultrasonic beam by using said ultrasonic probe toward another different direction.

9. An ultrasonic imaging apparatus according to claim 7, wherein:

said control means controls said drive signal generating means in such a manner that one ultrasonic beam is transmitted along one direction and another ultrasonic beam is transmitted along another direction before the one ultrasonic beam reaches a minimum depth point within the region set by said measurement region setting means and ultrasonic echoes reflected from the one and another directions are received and detection signals are separated from each other.

10. An ultrasonic imaging apparatus for transmitting an ultrasonic beam toward a region of interest located within an object to be inspected, receiving an ultrasonic echo reflected from said region of interest and processing detection signals so as to obtain image information of said region of interest, said apparatus comprising:

drive signal generating means for generating a plurality of drive signals;

an ultrasonic probe for transmitting an ultrasonic beam in accordance with the drive signals generated by said drive signal generating means and receiving an ultrasonic echo which is produced by the transmitted ultrasonic beam to output a plurality of detection signals;

signal processing means for obtaining image information of said region of interest on the basis of the plurality of detection signals output from said ultrasonic probe;

imaging sub-region setting means to be used for setting a sub-region to be imaged on the basis of at least one minimum depth point and at least one maximum depth point of said region of interest obtained by a pre-imaging operation; and control means for controlling both said drive signal generating means and said signal processing means to transmit the ultrasonic beam and receive the ultrasonic echo by using said ultrasonic probe in such a manner that the sub-region set by said imaging sub-region setting means is scanned, wherein:

said control means controls said drive signal generating means in such a manner that one ultrasonic beam is transmitted along one direction and another ultrasonic beam is transmitted along another direction before the one ultrasonic beam reaches a minimum depth point within the sub-region set by said imaging sub-region setting means and ultrasonic echoes reflected from the one and another directions are received and detection signals are separated from each other.

* * * * *